Aug. 14, 1956    R. E. BECKER    2,758,850
ROTATING SHAFT AND SEAL
Filed Dec. 15, 1950    2 Sheets-Sheet 1
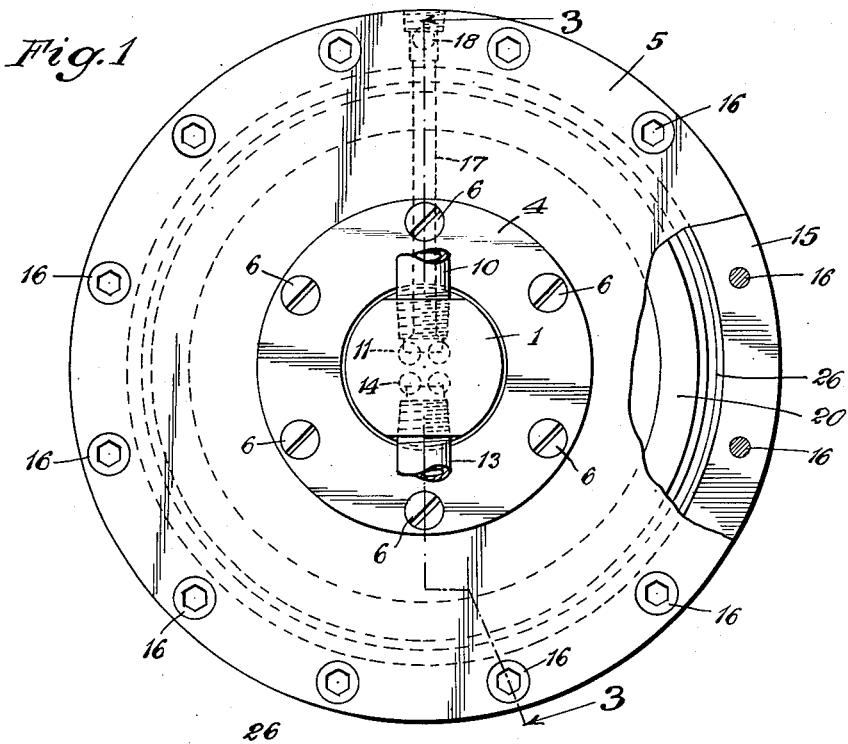
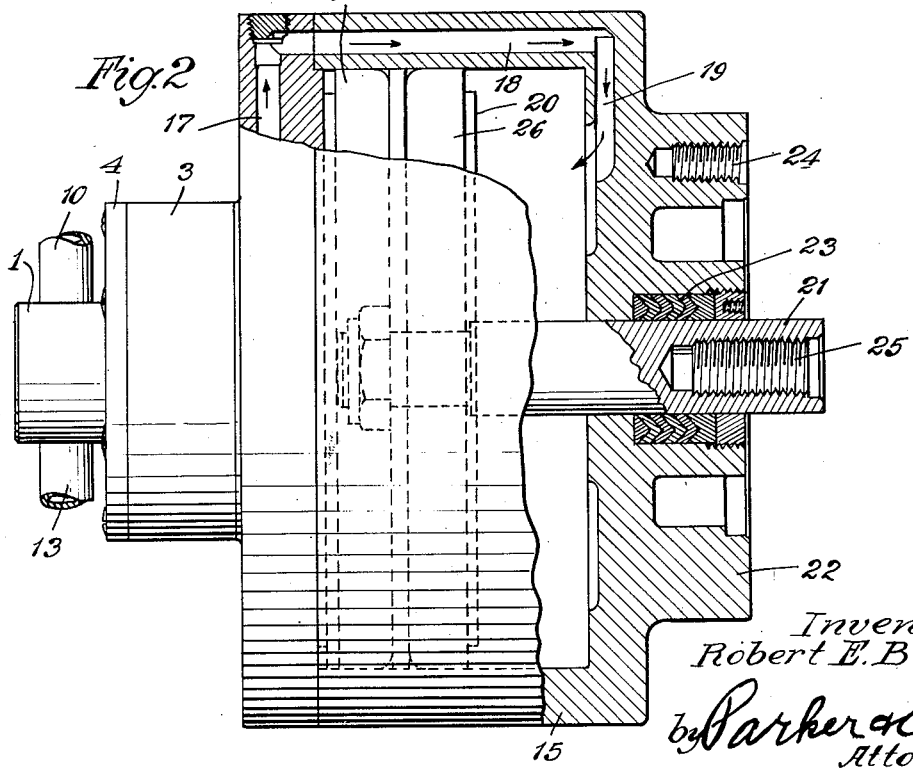
Inventor
Robert E. Becker
by Parker & Carter
Attorneys

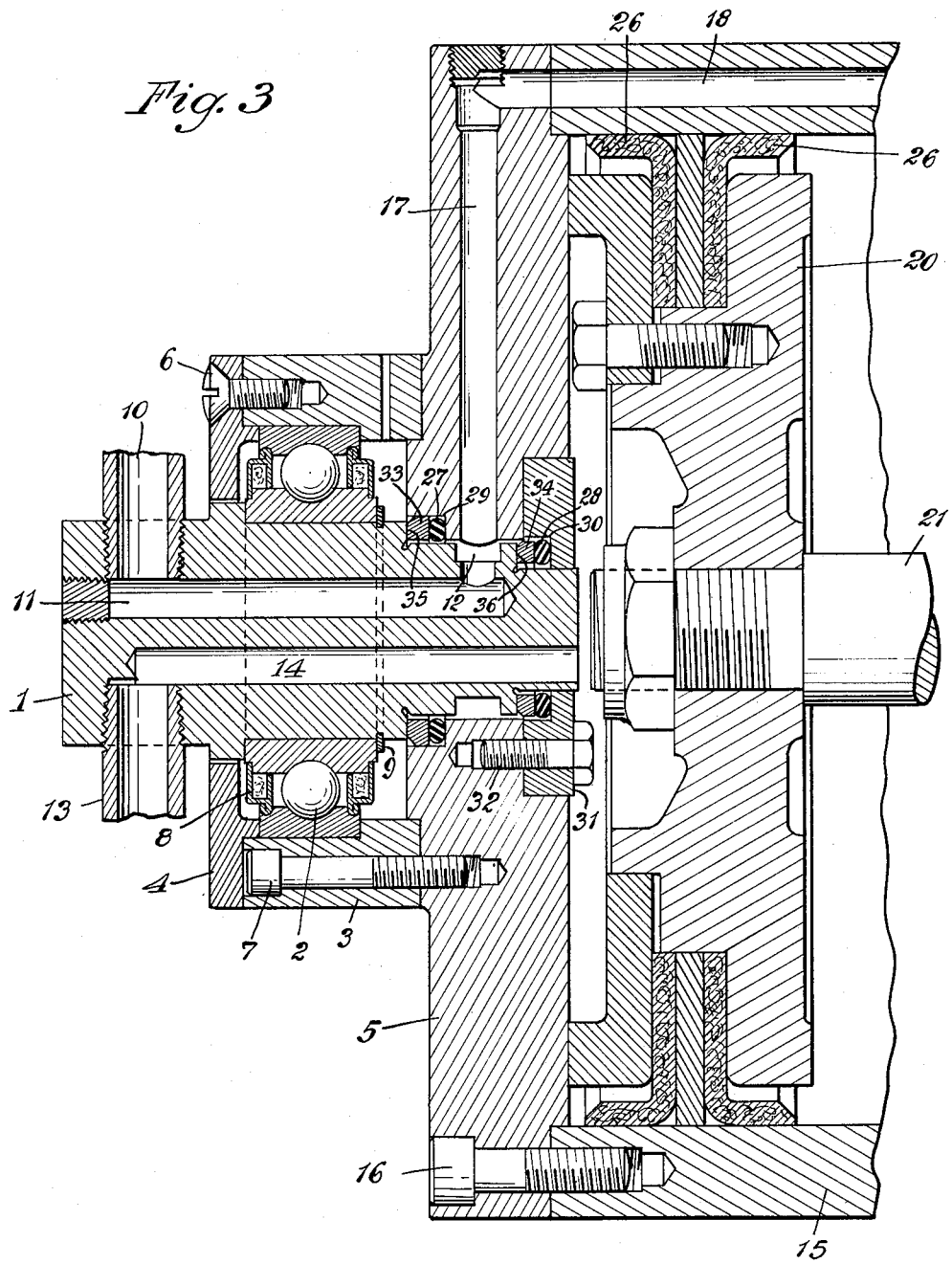

2,758,850

ROTATING SHAFT AND SEAL

Robert E. Becker, Logansport, Ind., assignor to Logansport Machine Co., Inc., a corporation of Indiana Application December 15, 1950, Serial No. 201,025

1 Claim. (Cl. 285—134)

My invention relates to improvements in air cylinders and has for one object to provide an air cylinder wherein the cylinder containing the air operated piston and the means for introducing air to the piston may have relative rotary motion. As illustrated, the air shaft is adapted to be at rest and the cylinder to rotate though obviously this relationship could be reversed.

My invention has for one of its objects to provide in connection with an air cylinder a support, means for subjecting the piston in the cylinder to air pressure to actuate it together with means for preventing leakage of air between the cylinder and the air source at the point where relative rotation takes place.

Other objects will appear from time to time throughout the course of the specification and claims.

My invention is illustrated more or less diagramfatically in the accompanying drawings, wherein—

Figure 1 is a front elevation;

Figure 2 is a side elevation in part section;

Figure 3 is a longitudinal section similar to Figure 2 on an enlarged scale.

Like parts are indicated by like characters throughout the specification and drawings.

1 is the air shaft which may be mounted or supported in any suitable manner by means not here shown, since those means form no part of my invention. 2 is a ball bearing, the inner race of which is carried by the air shaft 1, the outer race supporting the bearing housing 3. The outer race of the ball bearing 2 is held within the bearing housing 3 by the housing cap 4 which is centrally apertured to encircle the air shaft.

5 is a cylinder cover or adapter carried by the bearing housing 3. Screws 6 hold the housing cap 4 in position on the bearing housing 3 and screws 7 hold the cylinder cover 5 in place on the bearing housing. 8 indicates labyrinthine oil or grease seals associated with the ball bearing. 9 is a snap ring to hold the ball bearing in place on the air shaft.

10 is an air pipe threaded in the air shaft 1 communicating with an axial passage 11 in the air shaft which passage in turn communicates with the annular passage 12 about the outer periphery of the air shaft between it and the adapter. 13 is an air pipe threaded in the air shaft 1 communicating with a passage 14 which extends to the opposite end of the air shaft to communicate directly with the interior of the cylinder 15. Screws 16 hold the cylinder head or adapter to the cylinder body. 17 is a radial passage in the cylinder head or adapter 5 communicating with the annular passage 12 in the air shaft. 18 is a passage partially within the adapter 5, partially within the walls of the cylinder 15 communicating with a radial passage 19 which in turn communicates with the opposite end of the cylinder so that there is an air passage communicating with the cylinder at each side of the piston 20. 21 is a piston rod projecting through the integrally closed end 22 of the cylinder being provided with packing 23. 24, 25 are threaded apertures whereby the cylinder 15 and the piston rod 21 may be connected to any suitable mechanism. 26 is the usual piston packing.

27, 28 are rubber or plastic O rings, each contained within a channel 29, or between the cylinder adapter and the air shaft. The channel 30 is formed in part by a sealing ring retainer 31 held to its seat by screws 32. 33, 34 are sealing rings associated with the O rings 27, 28. These rings have lapped surfaces to engage similar lapped surfaces on the air shaft shoulders at 35 and 36. The inside diameter of the shaft shoulder 35 is greater than the outside diameter of the shaft shoulder 36, and the inside diameter of the annular passage 12 lies between the inside and outside diameter of the shaft shoulder 36; consequently, the inside diameter of the annular passage 12 is less than both the inside and outside diameter of the shaft shoulder 35. Air pressure from the annular chamber 12, reaching the O rings 27, 28 through the clearances shown, upset the O rings and tend to hold the lapped surfaces on the sealing rings and air shaft together to make the air seal, the sealing rings being thus biased laterally for that purpose.

Relative rotation of the cylinder body and the air shaft thus may take place without sensible air leakage. The ball or other bearing interposed between the air shaft and the cylinder is thus not exposed to the working pressure of the air in the system. Since the tightness of the air seal depends upon the pressure exerted by the O ring squeezing the sealing ring against its opposed lapped surface, any air line leakage pressure or any air entering through the clearance between the air shaft and the adapter or cylinder head into the chamber occupied by the O ring applying pressure to the ring on the opposite radial side from that normally receiving pressure, will only tend to increase the expanding pressure of the O ring and so tend to increase the tightness of the air seal.

I claim:

In a rotatable connection for the conveyance of a fluid, a housing having an aperture therein, a spindle rotatably mounted at its inner end in said housing aperture, an axial fluid passage within the spindle, a radial fluid passage within the housing generally at right angles to the axial fluid passage and aligned generally to intersect it, an annular fluid passage between the spindle and housing in communication with the axial and radial fluid passages, said inner end of said spindle having annular shoulders thereon, the inside diameter of one shoulder being at least equal to the outside diameter of the other shoulder, annular shoulders carried by said housing and encircling said aperture complementary to said spindle shoulders said shoulders forming annular sealing channels with fluid sealing units in each between the spindle and housing on both sides of the annular fluid passage, the sealing channels comprising opposed, spaced annular plane surfaces on both the spindle and housing disposed generally perpendicular to the axis of the spindle, each of the fluid sealing units comprising a sealing ring with an annular plane surface in lateral engagement with one of the annular plane surfaces of the sealing channel and a separate O ring in lateral engagement with both the sealing ring and the other annular plane surface of the sealing channel, and a fluid passage communicating with each of the annular sealing channels so that when pressure variations in the annular fluid passages are communicated to each of the sealing channels through the fluid passages, each O ring will respond and bias its sealing ring against its opposed annular plane surface at a pressure which varies in direct relation to the pressure of the fluid.

(References on following page)

References Cited in the file of this patent

UNITED STATES PATENTS

| | | | |
|---|---|---|---|
| 921,771 | Whitlock | May 18, | 1909 |
| 1,249,736 | Frink | Dec. 11, | 1917 |
| 1,284,225 | Bogart | Nov. 12, | 1918 |
| 1,851,723 | Neidow | Mar. 29, | 1932 |
| 2,412,287 | Phillips | Dec. 10, | 1946 |
| 2,415,181 | Johnson | Feb. 4, | 1947 |
| 2,420,626 | Stevenson | May 13, | 1947 |
| 2,420,718 | Odelius | May 20, | 1947 |
| 2,427,787 | Hunter | Sept. 23, | 1947 |
| 2,481,404 | Donner | Sept. 6, | 1949 |
| 2,565,208 | Dietiker | Aug. 21, | 1951 |
| 2,568,092 | Sloan et al. | Sept. 18, | 1951 |
| 2,576,673 | Cole | Nov. 27, | 1951 |
| 2,577,858 | Sampson | Dec. 11, | 1951 |
| 2,646,756 | Peguet | July 28, | 1953 |
| 2,676,548 | Lauck | Apr. 27, | 1954 |
| 2,701,146 | Warren | Feb. 1, | 1955 |